United States Patent
Lee et al.

(10) Patent No.: US 8,724,992 B2
(45) Date of Patent: May 13, 2014

(54) NODE APPARATUS AND METHOD OF RECEIVING OPTICAL SIGNAL THEREOF, AND RING NETWORK SYSTEM

(75) Inventors: Hyun Jae Lee, Daejeon (KR); Hong Ju Kim, Daejeon (KR); Bup Joong Kim, Daejeon (KR); Jea Hoon Yu, Daejeon (KR); Tae Whan Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 602 days.

(21) Appl. No.: 12/873,721

(22) Filed: Sep. 1, 2010

(65) Prior Publication Data

US 2011/0052194 A1   Mar. 3, 2011

(30) Foreign Application Priority Data

Sep. 1, 2009   (KR) .................. 10-2009-0082085

(51) Int. Cl.
*H04B 10/00*   (2013.01)
(52) U.S. Cl.
USPC ............................................................. 398/59
(58) Field of Classification Search
USPC ............................................................. 398/59
See application file for complete search history.

(56) References Cited

U.S. PATENT DOCUMENTS

| | | | |
|---|---|---|---|
| 7,113,701 B2 * | 9/2006 | Okada et al. ................ | 398/49 |
| 7,460,744 B2 * | 12/2008 | Nakagawa ..................... | 385/24 |
| 2004/0028407 A1 * | 2/2004 | Noheji ........................... | 398/59 |
| 2007/0297800 A1 | 12/2007 | Choi et al. | |
| 2008/0131121 A1 * | 6/2008 | Magri et al. ................... | 398/59 |
| 2010/0027996 A1 | 2/2010 | Chung et al. | |

FOREIGN PATENT DOCUMENTS

| | | |
|---|---|---|
| KR | 2003-0046224 | 6/2003 |
| KR | 1020050103556 | 11/2005 |
| KR | 1020080045030 | 5/2008 |

OTHER PUBLICATIONS

Chung, Hwan Seok et al., "Experimental demonstration of optical multicast using WSS based multi-degree ROADM," National Fiber Optic Engineers Conference on Optical Fiber Communication, pp. 1-3 (2008).

* cited by examiner

*Primary Examiner* — Danny Leung

(74) *Attorney, Agent, or Firm* — Nelson Mullins Riley & Scarborough LLP

(57) ABSTRACT

A ring network system includes a plurality of node apparatuses that are sequentially connected through a transmission medium that is formed in a ring form. In the ring network system, the remaining node apparatuses, except for a first node apparatus of the plurality of node apparatuses pass an optical signal that is transmitted from the first node apparatus, and a second node apparatus corresponding to a destination of the optical signal among the remaining node apparatuses, extracts the optical signal while transferring the first optical signal to a next node apparatus of the second node apparatus.

8 Claims, 7 Drawing Sheets

NODE APPARATUS AND METHOD OF RECEIVING OPTICAL SIGNAL THEREOF, AND RING NETWORK SYSTEM

CROSS-REFERENCE TO RELATED APPLICATION

This application claims priority to and the benefit of Korean Patent Application No. 10-2009-0082085 filed in the Korean Intellectual Property Office on Sep. 1, 2009, the entire contents of which are incorporated herein by reference.

BACKGROUND OF THE INVENTION (a) Field of the Invention

The present invention relates to a node apparatus, a method of receiving an optical signal thereof, and a ring network system.

(b) Description of the Related Art

As a network that can provide more bandwidth is required according to an increase in the number of Internet users and a wideband multimedia service, in an optical communication system, optical fiber is used as a transmission medium, and a wavelength division multiplexing (WDM) method is used.

The WDM method multiplexes and transmits optical signals of different wavelengths to one optical fiber.

Particularly, in an optical communication system of a WDM method having a ring structure, node apparatuses are connected in a ring form. In an optical communication system of a WDM method having such a ring structure, because data that are transmitted from one node are transmitted in one direction along a ring, a node apparatus rather than a destination to receive data reproduces an optical signal as needed, and transmits the optical signal to the next node apparatus. That is, in order to receive a signal that is received in one node apparatus in another node apparatus, a signal should be reproduced and retransmitted. Thereby, in each node apparatus, the quantity of receivers should be equal to that of optical wavelengths in the node apparatus, and in each node apparatus, the quantity of transmitters should also be equal to that of optical wavelengths that receive in the node apparatus, and thus in each node apparatus transmitters corresponding to the quantity of optical wavelengths are required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a node apparatus, a method of receiving an optical signal thereof, and a ring network system having advantages of transmitting a signal to another node apparatus without reproducing a received signal.

The present invention has been made in an effort to further provide a node apparatus, a method of receiving an optical signal thereof, and a ring network system having advantages of reducing the quantity of transmitters.

An exemplary embodiment of the present invention provides a ring network system. The ring network system includes a transmission medium and a plurality of node apparatuses. The transmission medium is formed in a ring form. The plurality of node apparatuses are sequentially connected through the transmission medium. The remaining node apparatuses, except for a first node apparatus among the plurality of node apparatuses passes an optical signal that is transmitted from the first node apparatus, and a second node apparatus corresponding to a destination of the optical signal among the remaining node apparatuses extracts the optical signal and transfers the optical signal to a next node apparatus of the second node apparatus.

Another embodiment of the present invention provides a method of receiving an optical signal in a destination node apparatus of a ring network system in which a plurality of node apparatuses are sequentially connected through a transmission medium that is formed in a ring form. The method includes passing through an optical signal that is transmitted in one direction from a source node apparatus of the plurality of node apparatuses through the transmission medium, and extracting the optical signal to receive the optical signal while passing through the optical signal.

Yet another embodiment of the present invention provides each node apparatus of a ring network system in which a plurality of node apparatuses are sequentially connected through a transmission medium that is formed in a ring form. The node apparatus includes an amplifier and an extraction and passage device. The amplifier amplifies a first optical signal to receive. The extraction and passage device extracts partial energy of the entire energy of the first optical signal to receive the first optical signal and that passes the first optical signal to a next node apparatus while receiving the first optical signal.

DETAILED DESCRIPTION OF THE EMBODIMENTS

Figure 1:
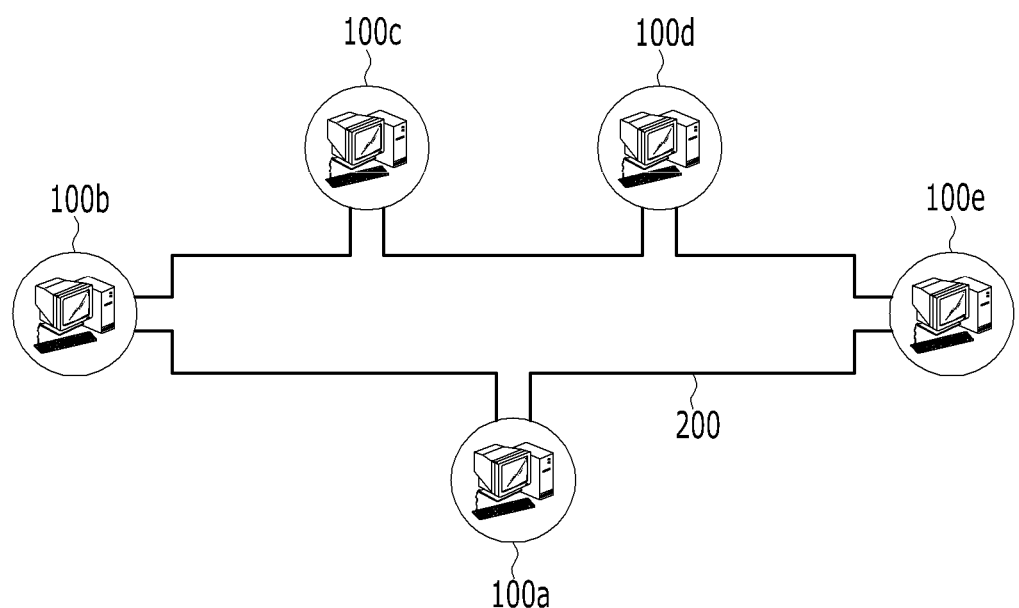
FIG. 1 is a diagram illustrating a ring network system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Now, a node apparatus, a method of receiving an optical signal thereof, and a ring network system according to an exemplary embodiment of the present invention will be described in detail with reference to the drawings.

FIG. 1 is a diagram illustrating a ring network system according to an exemplary embodiment of the present invention.

Referring to FIG. 1, the ring network system includes a plurality of node apparatuses 100a-100e, and a transmission medium 200 that is formed in a ring form.

The node apparatuses 100a-100e are sequentially connected through the transmission medium 200, and for example, the node apparatuses 100a-100e may be connected so that a physical distance between a node apparatus and a next node apparatus becomes a shortest distance.

The transmission medium 200 is formed in a ring form. The transmission medium 200 may use optical fiber. The optical fiber includes a plurality of optical channels, and optical signals to transmit from the node apparatuses 100a-100e are transmitted through different optical channels.

A source node apparatus of the node apparatuses 100a-100e transmits an optical signal through the transmission medium 200 using a wavelength division multiplexing (WDM) method. Specifically, the source node apparatus generates an optical signal by multiplexing at least one optical wavelength signal to transmit, and transmits the optical signal using an optical channel. In this case, the source node apparatus can transmit the optical signal together with control information. The control information includes an identifier of a source node apparatus to transmit an optical signal, an identifier of a destination node apparatus that receives the optical signal, and a number of optical channels used.

The optical signal that is transmitted from the source node apparatus is transmitted in one direction through the transmission medium 200. Therefore, the remaining node apparatuses, except for a source node apparatus that transmits the optical signal among the node apparatuses 100a-100e, pass through an optical signal that is transmitted by the source node apparatus. Further, a destination node apparatus to receive the optical signal that is transmitted by the source node apparatus among the remaining node apparatuses transfers an optical signal to the next node apparatus while extracting the optical signal that is transmitted by the source node apparatus.

Figure 2:
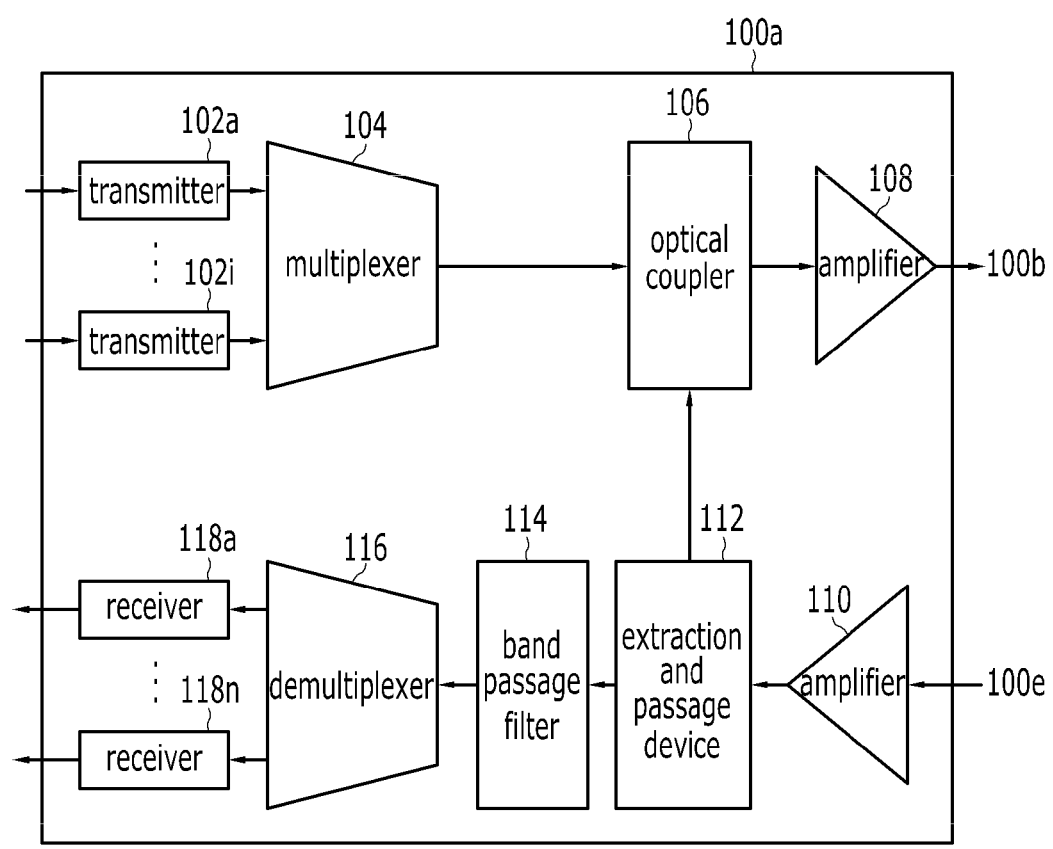
FIG. 2 is a diagram illustrating a node apparatus according to a first exemplary embodiment of the present invention.

FIG. 2 is a diagram illustrating a node apparatus according to a first exemplary embodiment of the present invention. FIG. 2 illustrates only a node apparatus 100a of the node apparatuses 100a-100e, and the remaining node apparatuses 100b-100e may be formed similarly to the node apparatus 100a.

Referring to FIG. 2, the node apparatus 100a includes transmitters 102a-102i, a multiplexer 104, an optical coupler 106, amplifiers 108 and 110, an extraction and passage device 112, a band passage filter 114, a demultiplexer 116, and receivers 118a-118n.

The transmitters 102a-102i output at least one different optical wavelength signal to transmit to the multiplexer 104. An optical wavelength signal may include, for example, a plurality of broadcasting channel signals.

The multiplexer 104 generates an optical signal by multiplexing an optical wavelength signal that is output from the transmitters 102a-102i, and outputs the optical signal to the optical coupler 106.

The optical coupler 106 couples an optical signal to be transmitted by the optical coupler 106 and an optical signal that is transmitted from another node apparatus.

The amplifier 108 amplifies the optical signal that is coupled in the optical coupler 106, and transmits the optical signal to the next node apparatus 100b through optical fiber. Unlike the case of FIG. 2, an optical signal that is coupled in the optical coupler 106 via a plurality of amplifiers may be transmitted to the next node apparatus 100b.

The node apparatuses 100b, 100c, 100d, and 100e pass through an optical signal that is transmitted from the node apparatus 100a, and a destination node apparatus of the node apparatuses 100b, 100c, 100d, and 100e transfers an optical signal to the next node apparatus while extracting and processing partial energy of the entire energy of the optical signal.

The amplifier 110 receives an optical signal that is transmitted through the node apparatus 100e and amplifies and outputs the optical signal.

The extraction and passage device 112 extracts an optical signal while transferring the optical signal that is transmitted through the node apparatus 100e to the optical coupler 106. In this case, extraction of the optical signal is determined through control information that is transmitted together with the optical signal. That is, the extraction and passage device 112 determines whether an identifier of a destination node apparatus that is included in control information agrees with an identifier of the extraction and passage device 112, and if the identifier of a destination node apparatus agrees with the identifier of the extraction and passage device 112, the extraction and passage device 112 extracts an optical signal. The extraction and passage device 112 according to an exemplary embodiment of the present invention extracts partial energy of the entire energy of the optical signal, and restores the optical signal using the extracted partial energy, thereby receiving the optical signal.

The band passage filter 114 outputs a desired optical wavelength signal of a plurality of optical wavelength signals that are included in the optical signal that is transferred from the extraction and passage device 112 to the demultiplexer 116.

The demultiplexer 116 separates an optical wavelength signal that is output from the band passage filter 114 on a wavelength basis, and outputs the optical wavelength signal that is separated on a wavelength basis to the receivers 118a-118n.

The receivers 118a-118n receive the optical wavelength signal that is separated on a wavelength basis by the demultiplexer 116. In this case, because only a desired optical wavelength signal is output from the band passage filter 114, the receivers 118a-118n can also receive an optical wavelength signal using the desired quantity of receivers.

Figure 3:
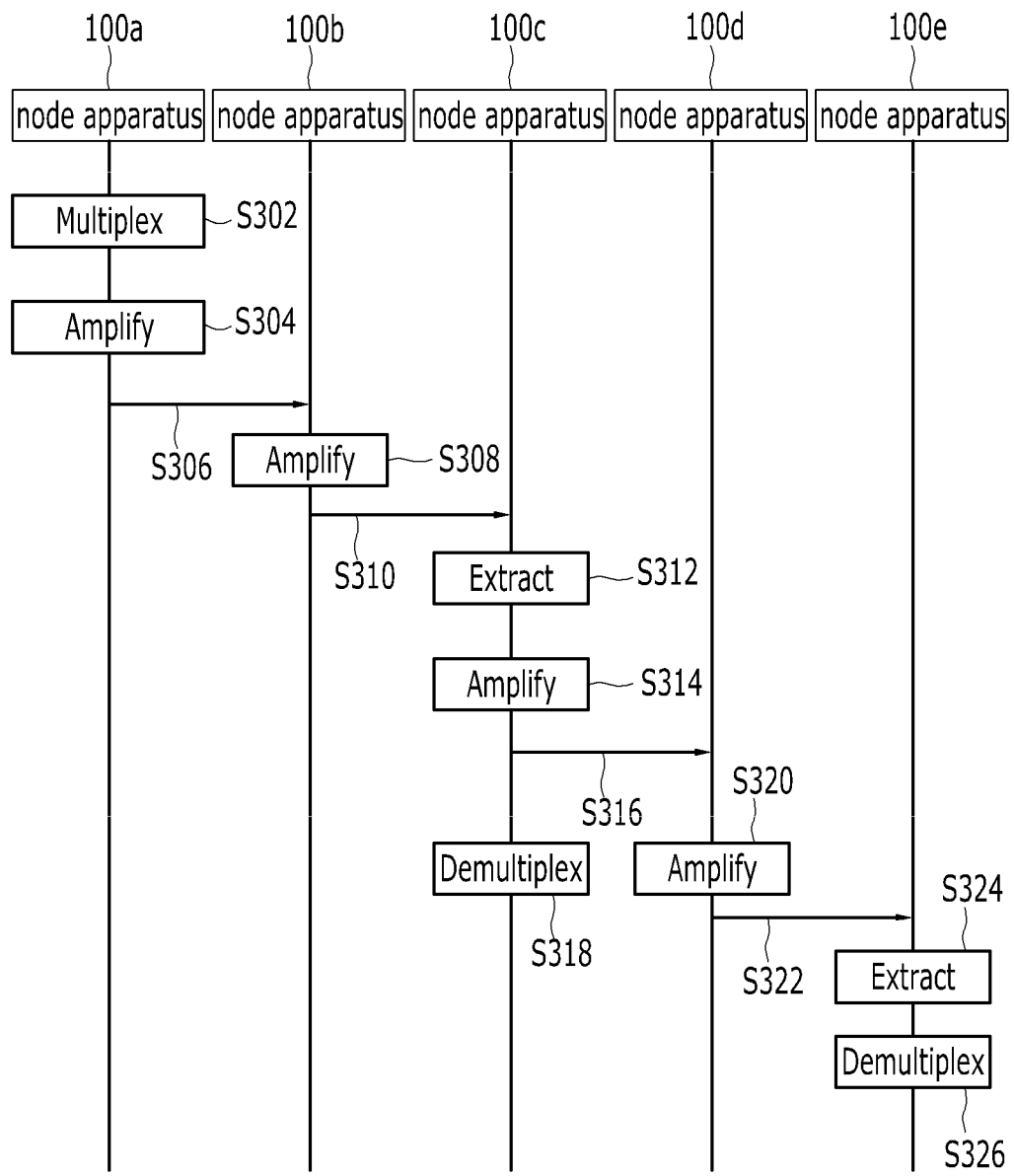
FIG. 3 is a diagram illustrating a method of transmitting/receiving an optical signal according to a first exemplary embodiment of the present invention.
Figure 4:
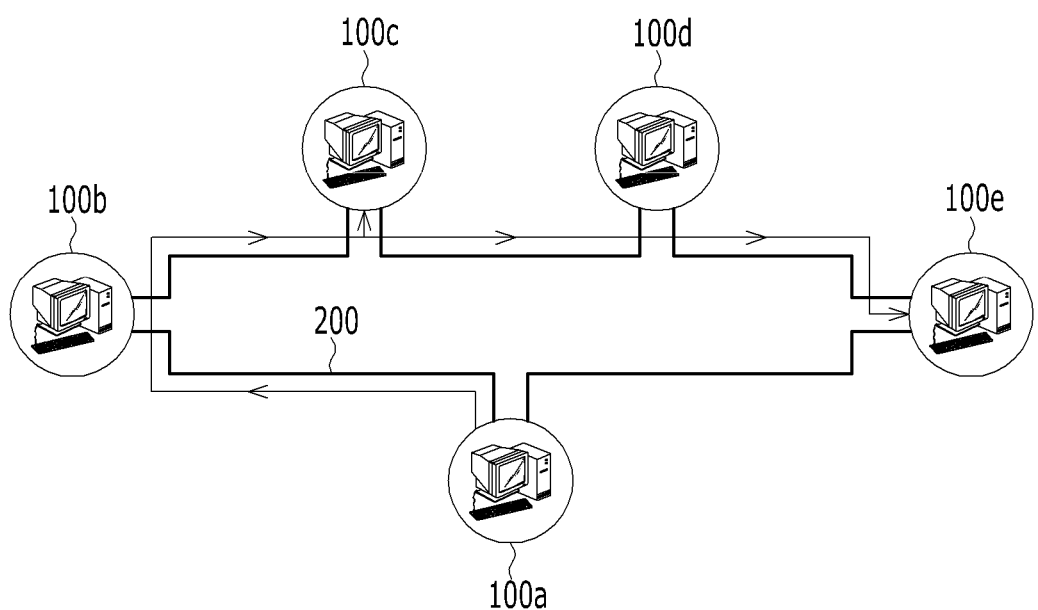
FIG. 4 is a diagram illustrating a method of transmitting/receiving an optical signal in FIG. 1.

FIG. 3 is a diagram illustrating a method of transmitting/receiving an optical signal according to a first exemplary embodiment of the present invention, and FIG. 4 is a diagram illustrating the method of transmitting/receiving an optical signal that is shown in FIG. 3 in FIG. 1. In FIG. 3, it is assumed that a source node apparatus is the node apparatus 100a, and that a destination node apparatus is the node apparatuses 100c and 100e of the node apparatuses 100b, 100c, 100d, and 100e.

Referring to FIG. 3, the multiplexer 104 of the node apparatus 100a generates an optical signal by multiplexing an optical wavelength signal to transmit (S302), and the optical coupler 106 of the node apparatus 100a transfers an optical signal to the amplifier 108. The amplifier 108 of the node apparatus 100a amplifies and outputs the generated optical signal (S304).

An optical signal (hereinafter referred to as an optical signal of the node apparatus 100a) that is transmitted from the node apparatus 100a is transmitted in one direction.

Therefore, the amplifier 110 of the node apparatus 100b amplifies an optical signal of the node apparatus 100a and transfers the optical signal to the extraction and passage device 112, and the extraction and passage device 112 of the node apparatus 100b determines whether the extraction and passage device 112 corresponds to a destination node apparatus through control information that is transmitted together with the optical signal. Further, the extraction and passage device 112 of the node apparatus 100b determines whether the next node apparatus 100c corresponds to a source node apparatus through control information. As a determination result, the node apparatus 100b and the node apparatus 100c do not correspond to a destination node apparatus and a source node apparatus, respectively, and thus the extraction and passage device 112 of the node apparatus 100b transfers an optical signal of the node apparatus 100a to the optical coupler 106. Accordingly, the optical coupler 106 transfers an optical signal of the node apparatus 100a to the amplifier 108, and the amplifier 108 of the node apparatus 100b amplifies an optical signal of the node apparatus 100a (S308) and transfers the optical signal to the node apparatus 100c (S310). In this case, when an optical signal to transmit exists in the node apparatus 100b, the optical coupler 106 couples an optical signal to transmit in the node apparatus 100b and an optical signal of the node apparatus 100a to transfer the coupled optical signal to the amplifier 108.

Next, the amplifier 110 of the node apparatus 100c amplifies an optical signal of the node apparatus 100a, which passes through the node apparatus 100b, to transfer the amplified optical signal to the extraction and passage device 112, and the extraction and passage device 112 of the node apparatus 100c determines whether the extraction and passage device 112 corresponds to a destination node apparatus through control information that is transmitted together with an optical signal of the node apparatus 100a, which passes through the node apparatus 100b, and whether the next node apparatus 100d corresponds to a source node apparatus. As a determination result, the node apparatus 100c corresponds to a destination node apparatus and the node apparatus 100d does not correspond to a source node apparatus, and thus the extraction and passage device 112 of the node apparatus 100c extracts an optical signal of the node apparatus 100a, which passes through the node apparatus 100b (S312), and transfers the optical signal of the node apparatus 100a, which passes through the node apparatus 100b, to the optical coupler 106 of the node apparatus 100c. Accordingly, the optical coupler 106 of the node apparatus 100c transfers an optical signal of the node apparatus 100a, which passes through the node apparatus 100b, to the amplifier 108, and the amplifier 108 amplifies the optical signal of the node apparatus 100a, which passes through the node apparatus 100b (S314), and transfers the optical signal to the node apparatus 100d (S316). In this case, the extraction and passage device 112 of the node apparatus 100c extracts only partial energy of the entire energy of an optical signal of the node apparatus 100a, which passes through the node apparatus 100b, restores an optical signal of the node apparatus 100a using the extracted partial energy, and demultiplexes a desired optical wavelength signal of optical wavelength signals of the optical signal on a wavelength basis (S318).

According to an exemplary embodiment of the present invention, the node apparatus 100c corresponding to a destination node apparatus of an optical signal may not perform a process of extracting the optical signal, again reproducing the extracted optical signal, and again inserting the reproduced optical signal into the optical fiber.

The amplifier 110 of the node apparatus 100d amplifies an optical signal of the node apparatus 100a, which passes through the node apparatus 100c, and transfers the optical signal to the extraction and passage device 112, and the extraction and passage device 112 of the node apparatus 100d determines whether the node apparatus 100d corresponds to a destination node apparatus through control information that is transmitted together with an optical signal of the node apparatus 100a, which passes through the node apparatus 100c. Further, the extraction and passage device 112 of the node apparatus 100d determines whether the next node apparatus 100e corresponds to a source node apparatus through control information. As a determination result, the node apparatus 100b and the node apparatus 100e do not correspond to a destination node apparatus and a source node apparatus, respectively, and thus the extraction and passage device 112 of the node apparatus 100d transfers an optical signal of the node apparatus 100a, which passes through the node apparatus 100c, to the optical coupler 106. Accordingly, the optical coupler 106 of the node apparatus 100d transfers an optical signal of the node apparatus 100a, which passes through the node apparatus 100c, to the amplifier 108, and the amplifier 108 amplifies an optical signal of the node apparatus 100a, which passes through the node apparatus 100c (S320), and transfers the optical signal to the node apparatus 100e (S322).

Finally, the amplifier 110 of the node apparatus 100e amplifies an optical signal of the node apparatus 100a, which passes through the node apparatus 100d, and transfers the optical signal to the extraction and passage device 112, and the extraction and passage device 112 of the node apparatus 100e determines whether the node apparatus 100e corresponds to a destination node apparatus through control information that is transmitted together with the optical signal of the node apparatus 100a, which passes through the node apparatus 100d, and whether the next node apparatus 100a corresponds to a source node apparatus. As a determination result, the node apparatus 100e corresponds to a destination node apparatus, and thus the extraction and passage device 112 of the node apparatus 100e extracts an optical signal of the node apparatus 100a, which passes through the node apparatus 100d (S324). In this case, as in the node apparatus 100c, the extraction and passage device 112 of the node apparatus 100e extracts only partial energy of the entire energy of an optical signal of the node apparatus 100a, which passes through the node apparatus 100b, restores the optical signal of the node apparatus 100a using the extracted partial energy, and demultiplexes a desired optical wavelength signal of optical wavelength signals of the optical signal on a wavelength basis (S326).

Because the node apparatus 100a corresponds to a source node apparatus, the extraction and passage device 112 of the node apparatus 100e does not transfer an optical signal of the node apparatus 100a, which passes through the node apparatus 100d, to the optical coupler 106. In this case, when the node apparatus 100a has a function of intercepting an optical signal that is transmitted by the node apparatus 100a, even if the node apparatus 100a is a source node apparatus, the extraction and passage device 112 of the node apparatus 100e transfers an optical signal of the node apparatus 100e to the optical coupler 106, whereby the optical signal of the node apparatus 100e may pass through the node apparatus 100a.

Such a method of transmitting/receiving an optical signal is shown in FIG. 4 using FIG. 1.

Further, such a method of transmitting/receiving an optical signal can be applied even to multicasting of the optical signal. That is, when the node apparatus 100a multicasts an optical signal, the remaining node apparatuses 100b, 100c, and 100d transfer an optical signal that is transmitted from the node apparatus 100a to the next node apparatuses 100c, 100d, and 100e, and the node apparatuses 100b, 100c, 100d, and 100e simultaneously extract an optical signal that is transmitted from the node apparatus 100a, thereby receiving the optical signal that is transmitted from the node apparatus 100a.

Figure 5:
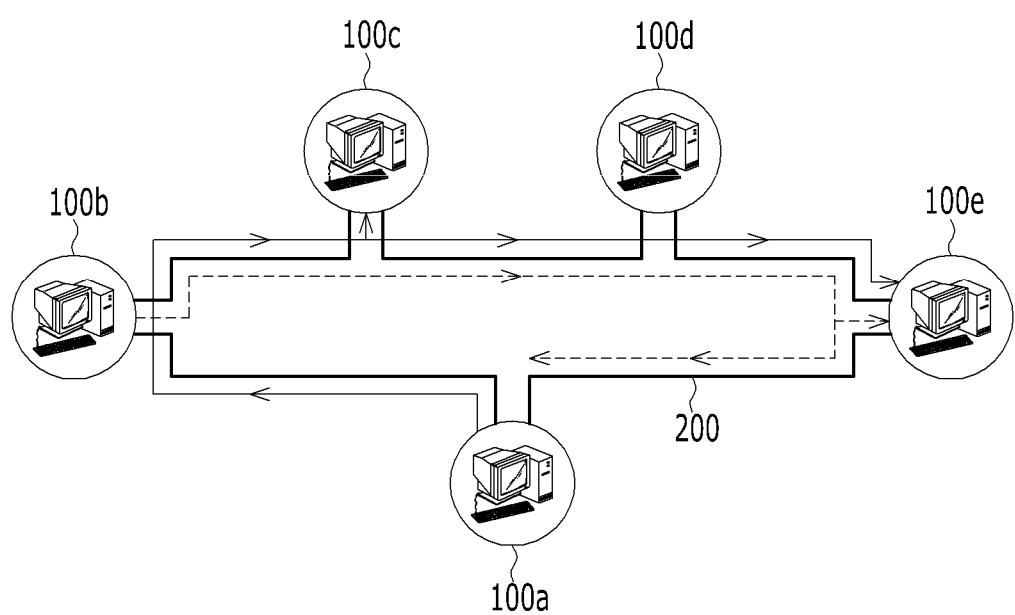
FIG. 5 is a diagram illustrating a method of transmitting an optical signal according to a second exemplary embodiment of the present invention in FIG. 1.

FIG. 5 is a diagram illustrating a method of transmitting/receiving an optical signal according to a second exemplary embodiment of the present invention in FIG. 1.

Referring to FIG. 5, when an optical wavelength signal to transmit exists in the node apparatus 100b, the multiplexer 104 of the node apparatus 100b generates an optical signal by multiplexing an optical wavelength signal to transmit, and the optical coupler 106 of the node apparatus 100b couples the generated optical signal and an optical signal that is transmitted from the node apparatus 100a and amplifies and outputs the coupled optical signal in the amplifier 108.

Accordingly, as described with reference to FIG. 4, the optical signal that is transmitted from the node apparatus 100a is transferred from the extraction and passage device 112 of the node apparatuses 100b, 100c, and 100d to the amplifier 108, and the amplifier 108 of the node apparatuses 100b, 100c, and 100d amplifies the optical signal that is transmitted from the node apparatus 100a to transfer the optical signal to the next node apparatuses 100c, 100d, and 100e. The extraction and passage device 112 of the node apparatuses 100c and 100e corresponding to a destination of an optical signal that is transmitted from the node apparatus 100a simultaneously extracts only partial energy of the entire energy of an optical signal that is transmitted from the node apparatus 100a, thereby receiving the optical signal that is transmitted from the node apparatus 100a.

Further, an optical signal that is transmitted from the node apparatus 100b through the same operation as that of FIG. 4 is transferred from the extraction and passage device 112 of the node apparatuses 100c, 100d, and 100e to the amplifier 108, and the amplifier 108 of the node apparatuses 100c, 100d, and 100e amplifies an optical signal that is transmitted from the node apparatus 100b to transfer the optical signal to the next node apparatuses 100d, 100e, and 100a. A node apparatus, for example the extraction and passage device 112 of the node apparatus 100e, corresponding to a destination of the optical signal that is transmitted from the node apparatus 100b, simultaneously extracts only partial energy of the entire energy of an optical signal that is transmitted from the node apparatus 100b, thereby receiving an optical signal that is transmitted from the node apparatus 100b.

Figure 6:
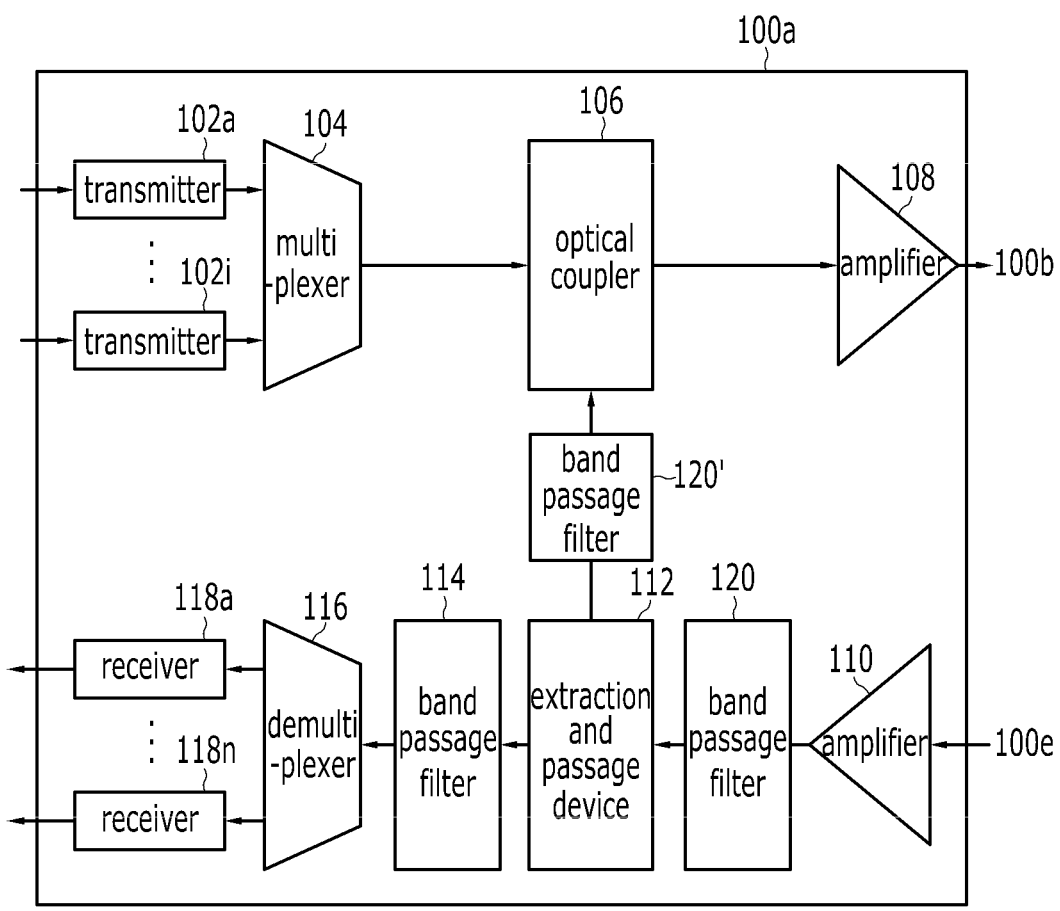
FIGS. 6 and 7 are diagrams illustrating node apparatuses according to second and third exemplary embodiments, respectively, of the present invention.
Figure 7:
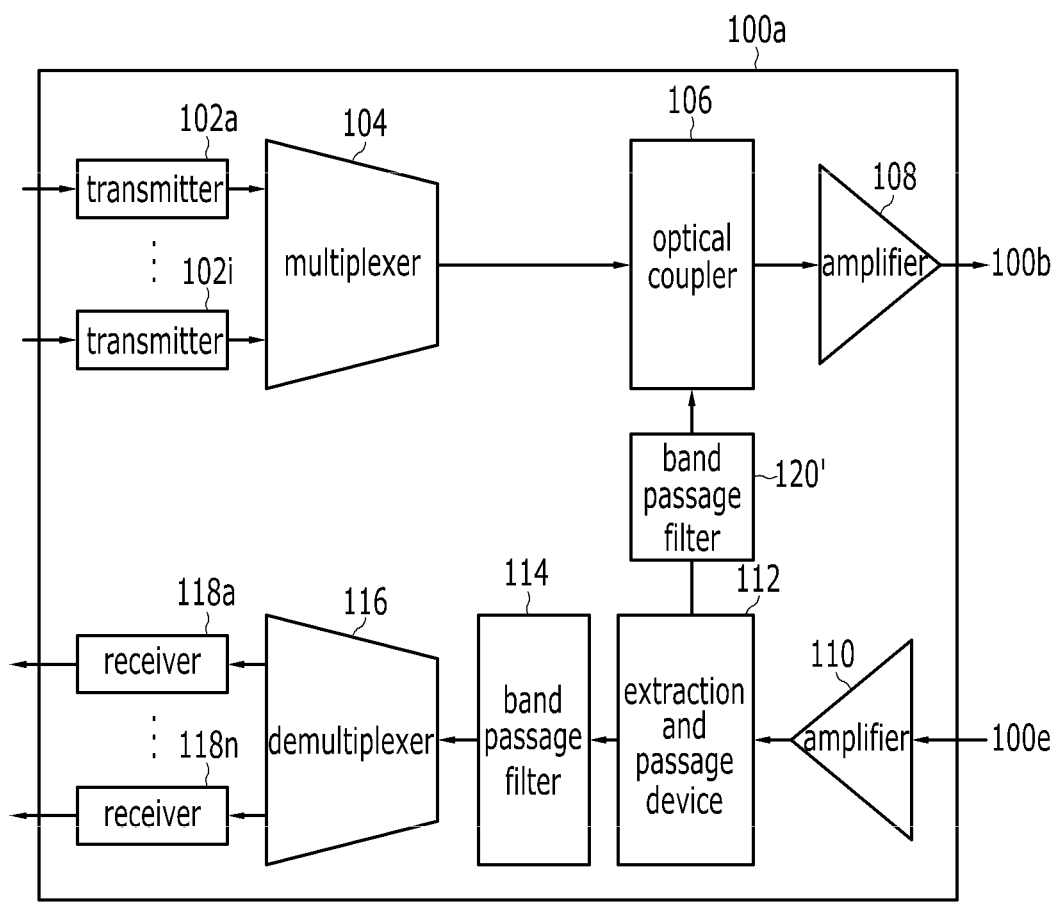

FIGS. 6 and 7 are diagrams illustrating node apparatuses according to second and third exemplary embodiments, respectively, of the present invention.

Referring to FIG. 6, a node apparatus 100a according to the second exemplary embodiment of the present invention may further include a band interception filter 120.

The band interception filter 120 intercepts receiving of an optical signal that is transmitted by the band interception filter 120 through a transmission medium (200 in FIG. 1) of a ring form, and is positioned between the amplifier 110 and the extraction and passage device 112. That is, when the node apparatus 100a is a source node apparatus of an optical signal, the band interception filter 120 intercepts an optical signal that is transmitted by the band interception filter 120, thereby preventing the optical signal from being transferred to the extraction and passage device 112.

Further, referring to FIG. 7, a band interception filter 120' is positioned between the extraction and passage device 112 and the optical coupler 106, and when the node apparatus 100b is a source node apparatus of an optical signal, the band interception filter 120' intercepts an optical signal that is transmitted from the node apparatus 100b, thereby preventing the optical signal from being transferred to the optical coupler 106. Accordingly, the optical signal that is transmitted from the node apparatus 100b may not be transmitted to the node apparatus 100b.

According to an exemplary embodiment of the present invention, a node apparatus of a ring network system requires only transmitters corresponding to the quantity of optical wavelength signals in which the node apparatus is to transmit, and by appropriately using the quantity of receivers, only a necessary signal can be received. Thereby, a ring network system can be formed with a small cost.

Further, a method of receiving an optical signal of a node apparatus according to an exemplary embodiment of the present invention is useful for providing a broadcasting service on a regional basis.

Exemplary embodiments of the present invention are not only embodied through the above-described apparatus and method, but are also embodied through a program that realizes a function corresponding to a configuration of exemplary embodiments of the present invention or a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A ring network system comprising:
   a transmission medium that is formed in a ring form; and
   a plurality of node apparatuses that are sequentially connected through the transmission medium,
   wherein an optical signal that is transmitted from a first node apparatus of the plurality of node apparatuses passes through the remaining node apparatuses, except for the first node apparatus, and
   wherein the remaining node apparatuses, except for a first node apparatus among the plurality of node apparatuses passes an optical signal that is transmitted from the first node apparatus, and
   a second node apparatus corresponding to a destination of the optical signal among the remaining node apparatuses, extracts partial energy of the optical signal transmitted from the first node and transfers the optical signal received from the first node to a next node apparatus of the second node apparatus,
   wherein the first node apparatus comprises a band interception filter that intercepts receiving of an optical signal that is transmitted by the first node apparatus through the transmission medium.

2. The ring network system of claim 1, wherein the first node apparatus comprises:
   a plurality of transmitters that output a plurality of optical wavelength signals to transmit, respectively;
   a multiplexer that multiplexes the plurality of optical wavelength signals to output the optical wavelength signal as the optical signal; and
   an amplifier that amplifies and transmits the optical signal that is output from the multiplexer.

3. The ring network system of claim 1, wherein the second node apparatus comprises:
   an amplifier that amplifies an optical signal that is transmitted through the transmission medium; and an extraction and passage device that extracts the amplified optical signal while transferring the amplified optical signal to the next node apparatus.

4. The ring network system of claim 3, wherein the extraction and passage device extracts partial energy of the entire energy of the amplified optical signal and restores the optical signal using the partial energy.

5. The ring network system of claim 3, wherein the second node apparatus further comprises:
a band passage filter that selects at least one of a plurality of optical wavelength signals that are included in the extracted optical signal; and
a demultiplexer that separates the at least one optical wavelength signal on an optical wavelength basis.

6. The ring network system of claim 1, wherein the first node apparatus transmits the optical signal together with control information, and the control information comprises an identifier of the first node apparatus that transmits the optical signal and an identifier of the second node apparatus to receive the optical signal.

7. The ring network system of claim 1, wherein the transmission medium comprises optical fiber.

8. The ring network system of claim 1, wherein the optical signal is transmitted in one direction through the transmission medium.

* * * * *